United States Patent [19]

Sachdeva

[11] Patent Number: 5,260,357
[45] Date of Patent: Nov. 9, 1993

[54] CORROSION RESISTANT WATERBONE ADHESIVE PRIMERS

[75] Inventor: Yesh P. Sachdeva, Concord, Calif.

[73] Assignee: The Dexter Corporation, Pittsburg, Calif.

[21] Appl. No.: 876,016

[22] Filed: Apr. 30, 1992

[51] Int. Cl.$^5$ ............................................. C08L 63/02
[52] U.S. Cl. .................................. 523/414; 525/530; 525/904; 428/416
[58] Field of Search ................. 523/414; 525/530, 904; 428/416

[56] References Cited

U.S. PATENT DOCUMENTS

| | | | |
|---|---|---|---|
| 3,931,448 | 1/1976 | Parkinson | 428/451 |
| 4,105,613 | 8/1978 | Clope et al. | 523/416 |
| 4,355,122 | 10/1982 | Fan | 525/530 |
| 4,749,735 | 6/1988 | Dersch et al. | 524/523 |
| 4,999,134 | 3/1991 | Liedek et al. | 546/245 |
| 5,076,951 | 12/1991 | Miles | 252/79 |

Primary Examiner—Melvyn I. Marquis
Assistant Examiner—D. Aylward
Attorney, Agent, or Firm—George A. Skoler

[57] ABSTRACT

An adhesive bonding primer composition containing a water-dispersible, modified epoxy resin and a water-dispersible corrosion inhibitor mixture of components I. and II. in which:

Component I. is at least one, but not more than two of:
(a.) a zinc salt of a carboxylic acid of the formula:

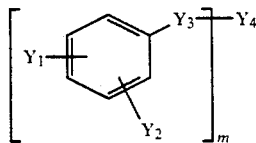

(b.) zinc phosphate, and
(c.) zinc molybdate, wherein $Y_4$ is hydroxyl or a radical of the formula:

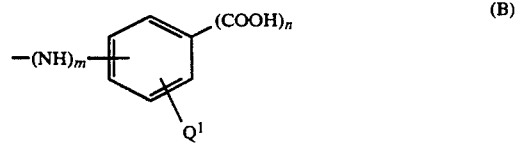

or

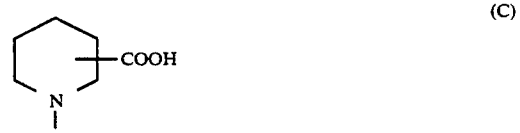

$Y_3$ is —CO— or —SO$_2$—, $Y_1$ is C$_1$-C$_8$-alkyl, C$_1$-C$_8$-alkoxy or halogen when $Y_4$ is other than hydroxyl, carboxyl when $Y_4$ is hydroxyl, or hydrogen when $Y_4$ is

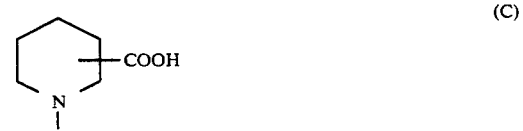

or $Q^1$ is nitro, or m is 2, $Y_2$ is hydrogen, C$_1$-C$_8$-alkyl, nitro, hydrogen or halogen, $Q^1$ is hydrogen, nitro or halogen, m and n are each 1 or 2; and Component II. is at least one other and different corrosion inhibitor from the group consisting of:
  i) (2-benzothiazolylthio)succinic acid, and
  ii) a corrosion inhibitor containing a metal other than chromium, having an atomic number of at least 3 and not greater than 81, from Groups 1, 2, 3, 4, 5, 6, 7 and 12 of the Periodic Table of the Elements (New Notation), and mixtures thereof. The mixtures of components I. and II. inhibit the corrosion of the water-dispersible, modified epoxy resin adhesive primer.

7 Claims, No Drawings

CORROSION RESISTANT WATERBONE ADHESIVE PRIMERS

RELATED PATENT APPLICATION

This application contains disclosures related to the invention of commonly assigned copending application Ser. No. 07/876,015 (Attorney Docket No. HY018), entitled "Waterborne Epoxy Derivative Composition," filed on even date herewith.

BRIEF DESCRIPTION OF THE INVENTION

This invention relates to waterborne adhesive bonding primers compositions containing a chromate-free or a reduced chromate corrosion inhibitor mixture that is suitable for use in bonding to metallic structures.

BACKGROUND TO THE INVENTION

Structural adhesive bonding primers serve three basic purposes: (1) they protect the adhered surface from being affected by the workshop environment; (2) they inhibit corrosion of the bonded surface during its service life; and (3) they provide a compatible surface to which the adhesive can bond for long-term strength. They should have excellent mar resistance, protect the adhered from re-oxidizing, and be readily cleaned prior to bonding using standard workshop procedures. Additionally, they should protect the adherend during high humidity conditions; from salt corrosive environments; and withstand the effects of numerous fuels, hydraulic fluids, and lubricating oils. Standard industry tests include hundreds of hours at elevated temperatures or at 100% relative humidity or at exposure to salt fog (100% relative humidity and 95° F. (35° C.)) environment. Exposure tests for several days, both at ambient and elevated temperatures, to various fluids and chemicals are common modes of evaluation by industry. The primers should not adversely affect the performance of the bonding adhesive. Typical industry requirements for the combination of primer and adhesive are tensile shear strengths up to 41.4 Mpa (6,000 psi), peel strengths up to 11.34 N/mm (65 pounds per lineal inch), and long-term service (up to 6,000 hours) at elevated temperatures (up to 232° C.) These prerequisites for a suitable adhesive bonding primer must be generally met before the primer achieves commercial acceptance.

The corrosion resistance required of a structural adhesive bonding primer is quite high, particularly when compared to a coating composition that is applied to a substrate for non-structural purposes. A structural adhesive bonding primer is part of a composite structure. It is the first layer applied to the metal adherend. The next layer is the adhesive. It is put on the adherend for the purpose of joining an adhering surface to the adherend. This results in the formation of a structural composite.

The criticality of stress corrosion of structural adhesive bonds is the subject of Bascom, *Adhesives Age*, pages 28, 29-35, April 1979. In this article, the author notes:

The most severe limitation to the use of structural adhesives is the susceptibility of the bond lines to attack by moisture. The effect of the moisture is generally considered a corrosion of the metal adherend, and evidence certainly exists to support this view. For example, in military operations in Southeast Asia, the seriousness of the problem was apparent from the extensive repair and refitting of aircraft caused by the delamination of aluminum skin and honeycomb structures.

Presently, there is no clear understanding of the mechanisms involved in adhesive bond stress corrosion, nor are there any well established means of predicting bond durability under moist or wet environments. In fact, there is disagreement as to whether the primary attack is on the adhesive or the metal adherend. As for predicting bond lifetimes, there is no generally accepted test method for adhesive bond stress corrosion.

The function of a structural adhesive bonding primer is to aid in keeping moisture from the adhesive-adherend interface and enhance the adhesion between the adherend and the adhesive. That action serves to minimize the impact of corrosion by acting as a barrier to moisture and passivating the adherend's surface from the impact of moisture that does penetrate to the adherend.

In the evolution of structural adhesive bonding primers, their formulations generally relied on dilute solvent solutions of modified epoxy or phenolic resins. These resins are generally considered innocuous, both being extensively used in food containers. However, materials used to cure these resins in adhesive bonding primers, such as amines, amides and imidazoles, may not be as innocuous. Solvents in the formulations have stimulated wide environmental concerns. The volatile organic compounds (VOCs) emitted by their evaporation from the adherend surface has been an ever increasing concern of industrial regulatory organizations.

Y. D. Ng and W. E. Rogers, in a paper entitled: "A Non-Chromated Water-Borne Adhesive Primer For Aerospace Applications" and given at the 33rd International SAMPLE Symposium, during Mar. 7-10, 1988, discuss the environmental issues of adhesive primers. They point out that asbestos, at one time a favored raw material for adhesives, was virtually eliminated from the market since the early 1980'. They note that the aerospace industry has increased concern about using solvent-borne bonding primers.

"Their high VOC contents (80-90%) are a target that Regional Air Quality Management Boards, especially those in areas prone to substantial periods of air pollution, are aggressively seeking to regulate." Illustrative of this concern are the strict air quality requirements mandated by the South Coast Air Quality Management DIstrict.[1] Though Y. D. Ng and W. E. Rogers indicate that most solvent-borne adhesive primers have little difficulty complying with 1987 SCAQMD Rule 1124 VOC limit for adhesive primers at 850 grams/liter, they fail to point out that typical epoxy/phenolic solvent-based adhesive bonding primers at about 10 percent solids emit VOCs into the atmosphere at levels approaching 800 grams/liter. Such VOC levels have been accepted because of the high performance the solvent based primers bring to the application. With ever increasing environmental concerns, such VOC levels are becoming unacceptable and there is a strong demand for epoxy based adhesive bonding primers that accommodate environmental concerns. SCAQMD has set the VOC limit for adhesive bonding primers at 250 grams/liter minus water, starting Jan. 1, 1993. This accords with the trend set for the coatings industry.

[1] South Coast Air Quality Management District (SCAQMD) has jurisdiction over air quality in the Greater Los Angeles Basis in southern Ca., U.S.A.

Such social reactions are stimulating the adhesive industry to find ways to reduce pollution by VOCs used as solvents in conventional adhesive bonding primers. Considerable emphasis exists to develop application technologies that reduce VOC emissions in adhesive bonding primer. A number of them have emerged to meet most but not all of the performance and application requirements, and at the same time meet emission requirements and regulations. One technology for overcoming the VOC problem involves the use of waterborne dispersions and solutions.

Clayton A, May, in his text entitled: *EPOXY RESIN Chemistry and Technology*, Second Edition, 1988, Published by Marcel Dekker, Inc., New York, N.Y., at page 766, makes the following characterization of waterborne coatings in general:

Waterborne industrial coatings are attractive because the usually contain only small amounts of solvent and can meet the newer air pollution regulations. In addition, they minimize fire and health hazards. On the other hand, aqueous systems lack the versatility and frequently the quality of solvent systems. Because of sensitivity to atmospheric conditions, they often must be applied under stringent controlled conditions of suitable temperature and humidity. Problems of corrosion often necessitate the use of stainless steel equipment. Some problems can be met by careful choice of solvents used in most waterborne coatings.

*Waterborne coatings* may be defined as coatings that contain water as the major volatile component and that utilize water to dilute the coating to application consistency. These coatings consist mainly of resinous binder, pigments, water, and organic solvent. The type of pigmentation and the method of incorporation of the pigment vary widely. It is usually easier to incorporate pigments directly into the organic phase where conventional dispersion techniques can be applied. . . .

Waterborne coatings can be made by dispersing or emulsifying the resin binder by use of added surfactants. This technique leads to opaque liquids. Because some hard resins are difficult or impossible to disperse directly into water, the resin sometimes can be dissolved in a water-immiscible solvent, and the resulting solution dispersed by the use of added surfactants. In this case, the solvent aids subsequent film coalescence. Surface activity or water dispersability also can be introduced into resin molecules by chemical modification of the resin by functional polar groups such as the carboxyl group.

Some very finely dispersed resins appear as clear as [sic] slightly hazy liquids; they frequently are described as soluble, solubilized, colloidal dispersions, micro-emulsions, hydrosols, etc. These resins contain built-in functional groups that confer water "solubility" upon the resin, and, normally, external added surfactants are not used.

Waterborne resin binders can be classified as anionic, cationic, or nonionic. *Anionic* dispersions are characterized by negative charges on the resin or by negative charges on the surfactant associated with the resin. *Cationic* dispersions have a positive charge on the resin or on the surfactant associated with the resin. *Nonionic* dispersions are those that have been dispersed by addition of nonionic surfactants or that contain a built-in hydrophilic segment such as polyethylene oxide which is part of the main chain of a relatively hydrophobic resin molecule.

Waterborne dispersions and solutions are to be contrasted with the water containing emulsion systems (oil in water varieties). In the latter case, the emulsion particles contain a concentration of highly volatile, water immiscible solvent plus a surfactant that keeps the emulsified particles suspended in the continuous water phase. During application, they rely on solvents to coalesce the deposited emulsion particles coupled with the surfactant, in order to form a continuous film that is free of pin holes and other defects. The waterborne dispersions and solutions can effectively address the VOC problem as well as the structural bonding issues.

Waterborne structural adhesive bonding primers introduce entirely different selection of resin and cure system, and introduce formulation problems not dealt with in solvent based adhesive bonding primer systems. For example, waterborne adhesive bonding primers are not as resistant to corrosive environments as are the more conventional solvent-borne adhesives. The conventional epoxy resins used in solvent-based systems are not water soluble or effectively water dispersible.

As May, supra, points out, epoxy resins are suitably modified to convert them into waterborne coatings. They may be modified to make suitable waterborne adhesive bonding primers. Their modification involves the conversion of the epoxy resin into a molecule that contains enough anionic, cationic or nonionic water compatibilizing groups so as to make the resulting resin water dispersible or compatible, as desired. The term "water-dispersible, modified epoxy resin," as used herein and in the claims, means a resin that is derived from the use of at least one compound that contains a vicinal oxirane group in its manufacture and is rendered either cationic, anionic or nonionic so as to be dispersible in water to form a stable coatable film therefrom onto a solid substrate. Such a resin may be soluble or dispersible in water either in the form of an emulsion or as a discrete dispersion. Without limiting the variety of water-dispersible, modified epoxy resin embraced by the invention, reference is made to a number of them in the following discussion.

Y. D. Ng and W. E. Rogers, supra, discuss the development of a waterborne structural adhesive bonding primer that uses the same multi-functional epoxy novolac resin as was used in "Hysol's EA 9205R (a 350° F.) [176.7° C.] service, solvent-borne adhesive primer." The less polar epoxy groups on the resin were transformed into more polar hydroxyl moieties. "Further treatment produced the cationic salt of the resin which provided the desired solubility and physical property characteristics." A combination of inhibitors are mentioned as replacements for chromates. They are stated to be proprietary. Properties of the proposed adhesive primer are discussed.

Clarke, U.S. Pat. Nos. 3,687,897, patented Aug. 29, 1972, and 3,789,053, patented Jan. 29, 1974, describe the reaction product of epoxides with isocyanates to produce oxazolidinones containing the unit structure:

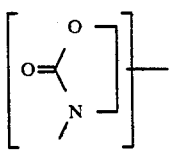

That work culminated in the development of coating compositions of dialkanolamine adducts of triglycidol ethers of trisphenols that is disclosed by Bertram et al., in U.S. Pat. No. 4,800,215, patented Jan. 24, 1989. The adducts of Bertram et al. may have the formula:

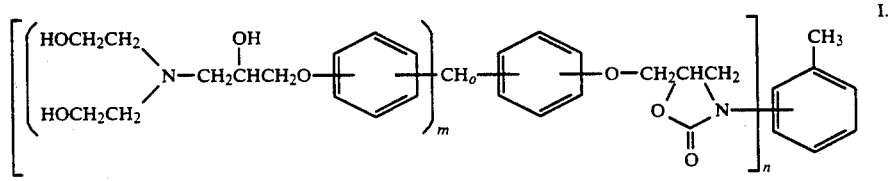

In the above formula, m has a value equal to 3-o, n is equal to 2, and o is 1 or 2, preferably 1.

These water soluble coating resins are described as suitable for use with amine-aldehyde, urea-aldehyde or phenol-aldehyde curing systems. The patentees indicate that the resultant coatings have excellent thermal stability and/or elongation. There is no apparent indication that those coating resins are suitable for making structural adhesive bonding primers.

The water soluble resins of U.S. Pat. No. 4,800,215 may be obtained neat. They may contain water soluble ether solvents such as monomethyl ether of ethylene glycol, dimethyl ether of ethylene glycol, monoethyl ether of ethylene glycol, diethylene glycol, monomethyl ether of diethylene glycol, monomethyl ether of 1,2-propylene glycol, monomethyl ether of 1,3-propylene glycol, monoethyl ether of 1,2-propylene glycol, and the like.

Fan, in U.S. Pat. No. 4,355,122, patented Oct. 19, 1982, describes, in the Abstract, "water-borne thermoplastic polyhydroxyether resins . . . prepared by grafting carboxyl-containing vinyl monomers onto phenoxy resins with a free radical initiator and then converting the graft copolymer to an ionomer suitable for use as coatings or adhesives." As Fan points out, the thermoplastic polyhydroxyether resin that is subjected to grafting is characterized by the formula:

—[—D—O—E—O—]$_n$—

"wherein D is the radical residuum of a dihydric phenol, E is an [sic] hydroxyl containing radical residuum of an epoxide and n represents the degree of polymerization and is at least 30 and is preferably 80 or more." The phenoxy resins are epoxy modified resins, as the Fan patent shows. The phenoxy resins are described in the patent as being the reaction product of about 0.985 to about 1.015 moles of an epihalohydrin

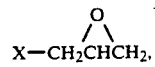

where X is halogen, with one mole of a dihydric phenol together with from about 0.6 to 1.5 moles of an alkali metal hydroxide, such as sodium hydroxide or potassium hydroxide generally in an aqueous medium at a temperature of about 10° C. to about 50° C. until at least about 60 mole percent of the epihalohydrin has been consumed. In commercial phenoxy resins, the dihydric phenol is bisphenol A [2,2-bis(4-hydroxyphenol)propane] and the epihalohydrin is epichlorohydrin. The resulting polymer may have the formula:

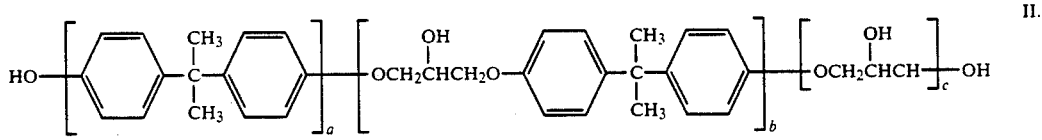

wherein either a or c is one or zero depending on whether bisphenol A or epichlorohydrin is used in molar excess, and b has the value of n defined above by Fan. The description of grafted phenoxy resins described at column 2, line 60 to column 7, lines 14, is incorporated herein by reference. Examples 1–4 of Fan are believed to illustrate a preferred acrylic grafted that are rendered water soluble by converting the carboxy of the grafted acrylyl moiety to an hydroxyl amine salt by reaction with dimethylethylamine. A particularly preferred resin of that class is UCAR Phenoxy Resin PKHW-35, sold by Union Carbide Chemicals & Plastics Company, Inc., Danbury, CT (U.S.A.), an amine-neutralized, carboxylated phenoxy resin that is colloidal in nature when dispersed in water. It is characterized as having excellent emulsion stability from 0° C. to 55° C., without the need of a surfactant.

It is believed that grafting in PKHW-35 occurs at the tertiary hydrogen of the epichlorohydrin reaction product unit characterized in the phenoxy formula, as:

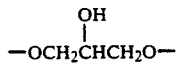

Epoxy based adhesive bonding primers typically contain corrosion inhibitors. The most effective, and hence, the most widely used inhibitors are chromate (+6) salts such as potassium chromate, barium chromate, strontium chromate, zinc chromate and the like. They are usually part of the pigment composition of the formulation. Chromate pigments are listed as toxic substances under SARA Title III, Section 313.[2] They are listed as chemicals known to cause cancer or reproductive toxicity under California Proposition 65.[3] Their total or partial removal from any formulation is desirable, so long as the formulation possesses satisfactory corrosion inhibition. Due, in part, to this development, a need has arisen for non-chromate based corrosion inhibiting inhibitors. In particular, there is a need for non-chromate based corrosion inhibiting inhibitors for use in epoxy-derived adhesive bonding primers.

[2] Superfund Amendments, a Re-Authorization Act of 1986 (SARA), Title III, Sections, 311, 312 and 313, United States Federal Regulation.
[3] Proposition 65 (California Governor's list of "Chemicals known to cause cancer or reproduction toxicity"), State of California (U.S.A.) Regulation.

Corrosion occurs primarily as a result of electrochemical processes. At the interface between the substrate and the primer, an anodic surface is formed. Substrate ions, e.g. $Fe^o$ and $Al^o$ are oxidized, and go into solution. Electrons that are released from this reaction flow to the cathodic surface where they react with electrolytes such as water and salt solution. The formation of this circuit, and the subsequent chemical reactions, results in corrosion. The inhibitors act to prevent this corrosion through anodic passivation.

In order for anodic passivation to occur, the potential of the substrate must be increased enough such that substrate ions will not go into solution. The inhibitors work to cause this effect. Further, reduced pigment ions react with the soluble substrate ions to form an insoluble barrier on the substrate. This barrier prevents the movement of ions essential to the process of corrosion.

Chromates provide excellent corrosion protection and thus they are widely found in corrosion resistant adhesive primers. It follows that chromate replacements must approximate, or exceed, their performance. The industry typically assesses performance against procedures for testing procedures, such as ASTM B117-85[4] which provides procedures for testing corrosion resistance in compositions deposited on a substrate.[5] These measurements may be utilized in conjunction with an industry standard such as BMS5-89.[6] However, due to the critical nature of the adhesive components in structural performance of the article of manufacture in which it is employed, such as an airplane component, many manufactures require even higher standards.

[4] American Society for Testing and Materials, Philadelphia, P.A.
[5] With these standards as a guideline, the following test is a typical one to sample corrosion resistance of inhibitors. The substrate surface is cleaned and prepared. The primer is subsequently applied. The primer is applied at a thickness between 0.2 and 0.4 mils, with a preference for 0.3 mils. Once the primer is applied, it is cured at a suitable temperature. The substrate is cut into 3'×3' squares. A scribe is etched into the substrate in the shape of an "X." The scribes are subjected to a 5% sodium chloride salt spray for 1,000, 2,000, and 3,000 hours. At the end of these periods, the squares are removed and the excess salt is scrubbed loose. Three relevant measurements are taken: number of pits in the scribe, undercutting, and percentage of the scribe that is shiny. Three relevant measurements are taken: number of pits in the scribe, undercutting, and percentage of the scribe that is shiny. These measurements may be compared with an industry standard. These standards are set out in BMS5-89, infra.
[6] Boeing Material Specification (1989).

As pointed out above, corrosion is a major issue with respect to structural adhesive primers. Consequently, a number of industries have strict corrosion inhibition standards when it comes to corrosion inhibition of structural adhesive bonding primers. The issue of corrosion inhibition is compounded in the case of waterborne structural adhesive bonding primers because of the formulation problems and the fact that they form a coating with different surface and structural characteristics.

The literature abounds with non-chromate corrosion inhibitors and many of them justly or unjustly are stated to be equivalent in performance to chromates. Typically, such claims are limited to solvent based coating systems and not to waterborne adhesive bonding primers where corrosion failure results in immediate structural delamination.

THE INVENTION

This invention relates to a waterborne structural adhesive bonding primer composition in which the resin system is a water-dispersible, modified epoxy resin containing a minimal chromate content or is chromate-free yet possesses corrosion inhibition that is equivalent to the corrosion resistance of the best epoxy resin solvent based structural adhesive bonding primer which utilizes only chromate corrosion inhibitors. The waterborne structural adhesive bonding primer of the invention is suitably employed with 250° F. (121° C.) and 350° F. (176.7° C.) cure epoxy resin systems.

The invention encompasses a water-dispersible, modified epoxy resin composition containing a water-dispersible, corrosion inhibitor mixture of components I. and II. in which:

Component I. is at least one of:

(a.) a zinc salt of a carboxylic acid of the formula:

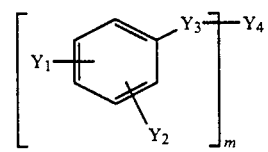

(b.) zinc phosphate, and
(c.) zinc molybdate,
wherein $Y_4$ is hydroxyl or a radical of the formula:

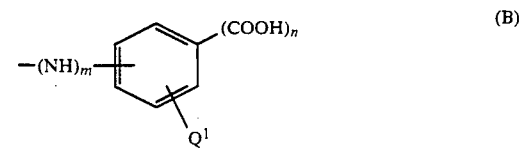

or

$Y_3$ is —CO— or —SO$_2$—, $Y_1$ is $C_1$–$C_8$-alkyl, $C_1$–$C_8$-alkoxy or halogen when $Y_4$ is other than hydroxy, carboxyl when $Y_4$ is hydroxyl, or hydrogen when $Y_4$ is

or $Q^1$ is nitro, or m is 2, $Y_2$ is hydrogen, $C_1$–$C_8$-alkyl, nitro, hydrogen or halogen, $Q^1$ is hydrogen, nitro or halogen, m and n are each 1 or 2; and Component II. is at least one other and different corrosion inhibitor from the group consisting of:
i) (2-benzothiazolylthio)succinic acid, and ii) a corrosion inhibitor containing a metal other than chromium, having an atomic number of at least 3 and not greater than 81, from Groups 1, 2, 3, 4, 5, 6, 7 and 12 of the Periodic Table of the Elements (New Notation), and mixtures thereof. The mixtures of components I. and II. inhibit the corrosion of the water-dispersible, modified epoxy resin adhesive primer at the adherend surface.

The invention relates to water-dispersible, modified epoxy resin composition in which component II. represents a variety of combinations of inhibitors such as:

1. (2-benzothiazolylthio)succinic acid combined with the I. component;
2. a mixture of (2-benzothiazolylthio)succinic acid and calcium silicate on an amorphous gel of silica combined with the I. component;
3. a mixture of a precipitated calcium silicate, zinc iodide, and lithium borate combined with the I. component;
4. a mixture of a precipitated calcium silicate, a calcium strontium zinc phosphosilicate, zinc iodide, and lithium borate combined with the I. component;
5. a mixture of zinc iodide and manganese (III) acetate combined with the I. component.
6. bismuth nitrate combined with the I. component;
7. cerium chloride combined with the I. component;
8. cerium molybdate combined with the I. component;
9. sodium thioglycolate combined with the I. component;
10. calcium strontium zinc phosphosilicate combined with the I. component; and
11. a water-dispersible mixture of niobium oxide and cerium molybdate combined with the I. component.

The water-dispersible, modified epoxy resin is a modification of a standard resin based on the presence of an epoxy group, i.e.,

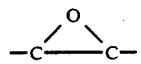

either in a reactant or in the end product resin, which epoxy group is thereafter reacted to introduce functional groups making the resin water dispersible, either by dissolution in water, stable dispersion in water, or by emulsification in water. Modification of the epoxy group is typically effected by reaction with an active hydrogen containing compound, such as a compound containing groups such as hydroxyl, amino, imino, mercapto, carboxylic, and the like. The resulting modified reaction of the epoxy group and the active hydrogen containing compound is the formation of a unit such as:

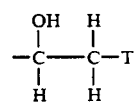

in which T is the residue of the active hydrogen containing compound, and may contain functional groups such as tertiary nitrogen, carboxyl, hydroxyl, hydroxyamino, and the like, any of which are capable of converting the reaction product into a water dispersible material.

Illustrative of such structures are the alkanolamine-epoxy reaction product characterized by the formula:

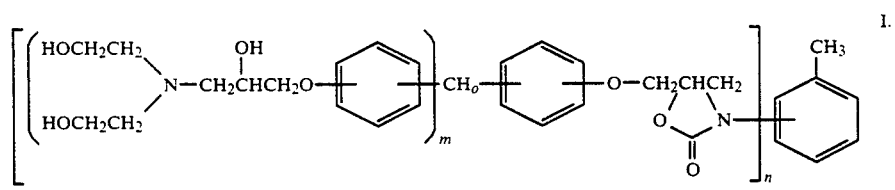

The water-dispersible, modified epoxy resin adhesive bonding primers of the invention are suitably employed on a variety of substrates, such as aluminum and steel. The primers perform effectively when applied to areas such as engine components.

In the above formula, m has a value equal to 3-o, n is equal to 2, and o is 1 or 2, preferably 1. A particularly preferred epoxy-derived composition is the diethanolamine reaction product of the formula:

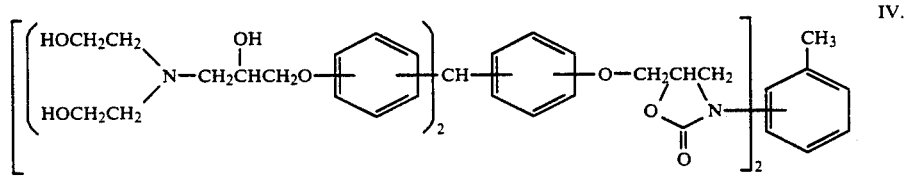

DETAILED DESCRIPTION OF THE INVENTION

The water-dispersible, modified epoxy resin primers of the invention exhibit excellent stability, adhesion, and application properties. Their corrosion resistance performance equals the comparable chromate containing water-dispersible, modified epoxy resin primer compositions.

The above composition may be used in combination with formaldehyde based resins, such as described in U.S. Pat. No. 4,800,215, the soluble coating compositions of dialkanolamine adduct of triglycidol ethers of the modified trisphenol are cured by amine-aldehyde resins, melamine-aldehyde resins, urea-aldehyde resins, and phenol-aldehyde resins. Such resins can be used in the practice of this invention.

In a preferred embodiment of the invention, the primer composition may contain the combination of (i) dialkanol amine adducts of an oxazolidinone modified polyglycidyl ether of a tris(hydroxyphenyl)alkane such as described in formula I. above, dissolved in a water vehicle, and (ii) a rigid ring substituted polyethylenically unsaturated carboxylate, carboxamide or carboximide intimately dispersed in the water vehicle and the dialkanol amine adduct of an oxazolidinone modified polyglycidyl ether of a tris(hydroxyphenyl)alkane, in combination with the water-dispersible corrosion inhibitor mixture of the invention. Such a composition may contain other ingredients, such as formaldehyde-based resins, flow control aids, anti-foaming agents, pigments, dyes, fiber reinforcement, and the like.

The rigid ring substituted polyethylenically unsaturated carboxylates, carboxamides and carboximides encompass a variety of compounds. Illustrative suitable rigid ring substituted polyethylenically unsaturated carboxylates, carboxamides or carboximides are the compounds of the formulae:

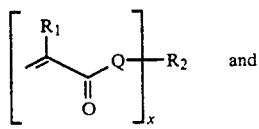 II.

and

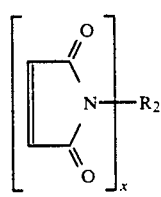 III.

in which $R_1$ is either hydrogen or alkyl of 1 to about 4 carbon atoms; x is a whole number having a value of at least 2, preferably from 2 to about 4; Q is divalent oxygen, amino (i.e., —NH—), or imino (i.e., —NR$_3$— wherein $R_3$ is alkyl of 1 to about 4 carbon atoms, phenyl and substituted phenyl), and $R_2$ is a rigid cyclic moiety having a free valence equal to x. Illustrative of suitable rigid cyclic moieties are the aromatic ring structures and cycloaliphatic ring structures, especially the cycloaliphatic ring structures that contain an endo bridging unit such as methylene, ethylene, ethylidene, propylene, and the like, and/or a fused ring structure, which form a polycyclic structure.

In formula II., the ethylenic unsaturation defined within the brackets constitutes an acrylic moiety. In the terms of this invention, the term "acrylic" is intended to encompass the family of acrylics, in which $R_1$ is either hydrogen or alkyl of 1 to about 4 carbon atoms. In the case of formula III., the ethylenic unsaturation defined within the brackets is a maleimide group. In the terms of this invention, the term "maleimide" is intended to encompass the family of maleimides, such as those in which hydrogens attached to unsaturated carbons are replaced with alkyl groups of 1 to about 4 carbon atoms.

As noted previously, x is a whole number having a value of at least 2, preferably from 2 to about 4; Q is divalent oxygen or amino (i.e., —NH—), or imino (i.e., —NR$_3$— wherein $R_3$ is alkyl of 1 to about 4 carbon atoms, phenyl and substituted phenyl), and $R_2$ is a rigid cyclic moiety having a free valence equal to x.

Illustrative of suitable maleimides encompassed by formula III. are the following:

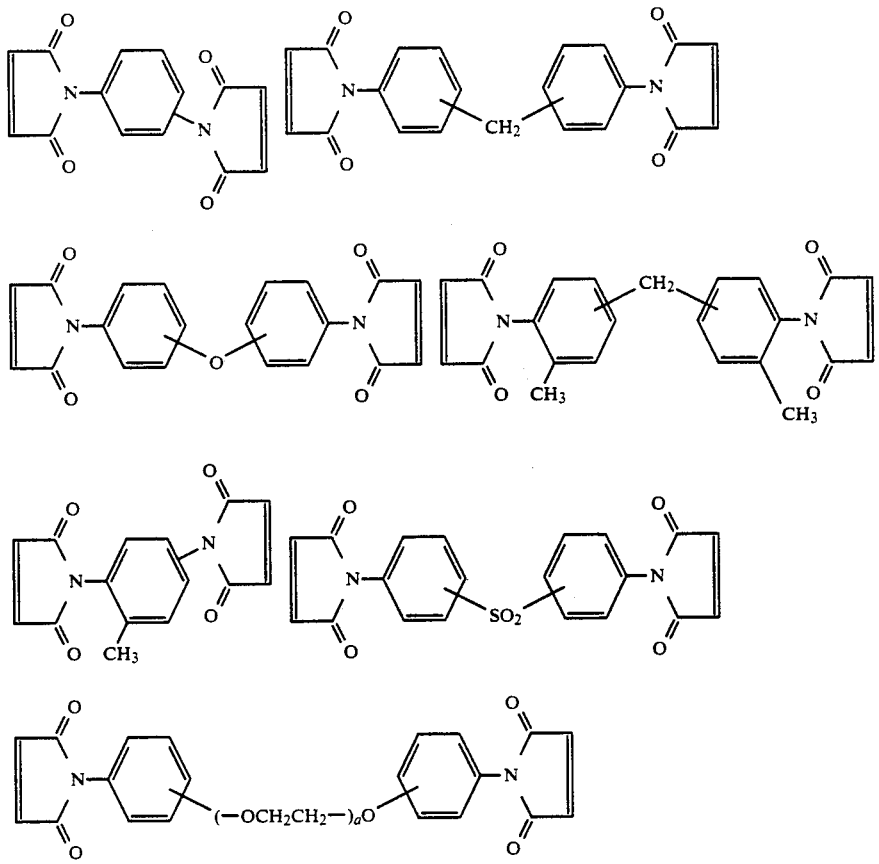

-continued
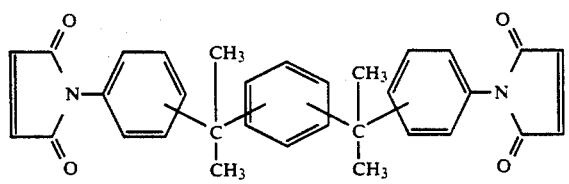
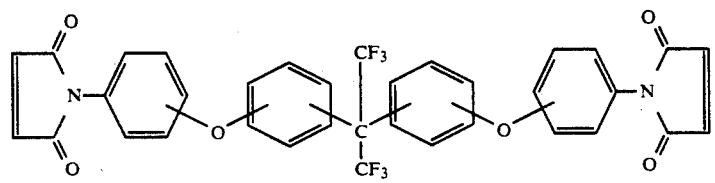
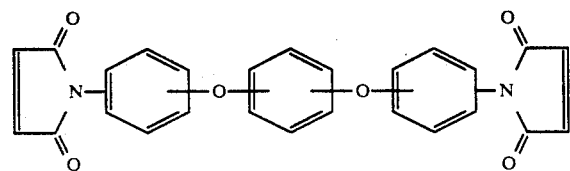
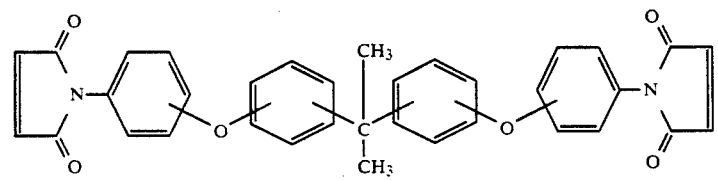
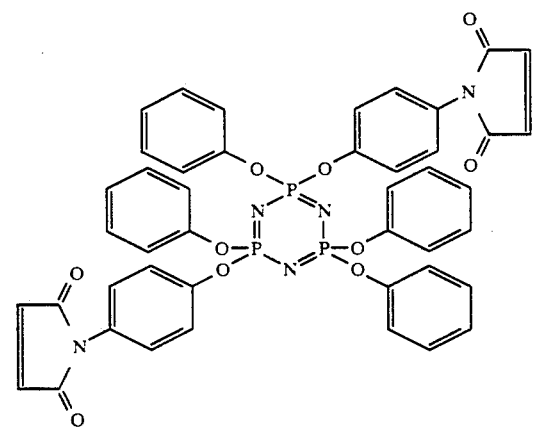
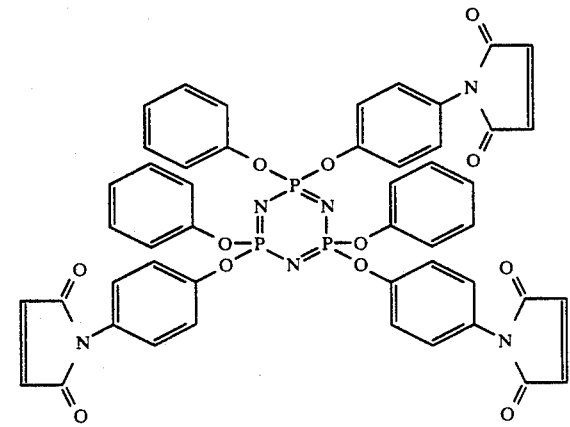

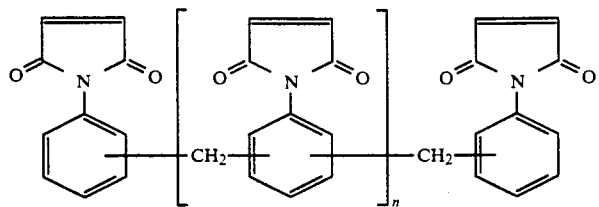
Suitable polyacrylics that may be employed include the following:
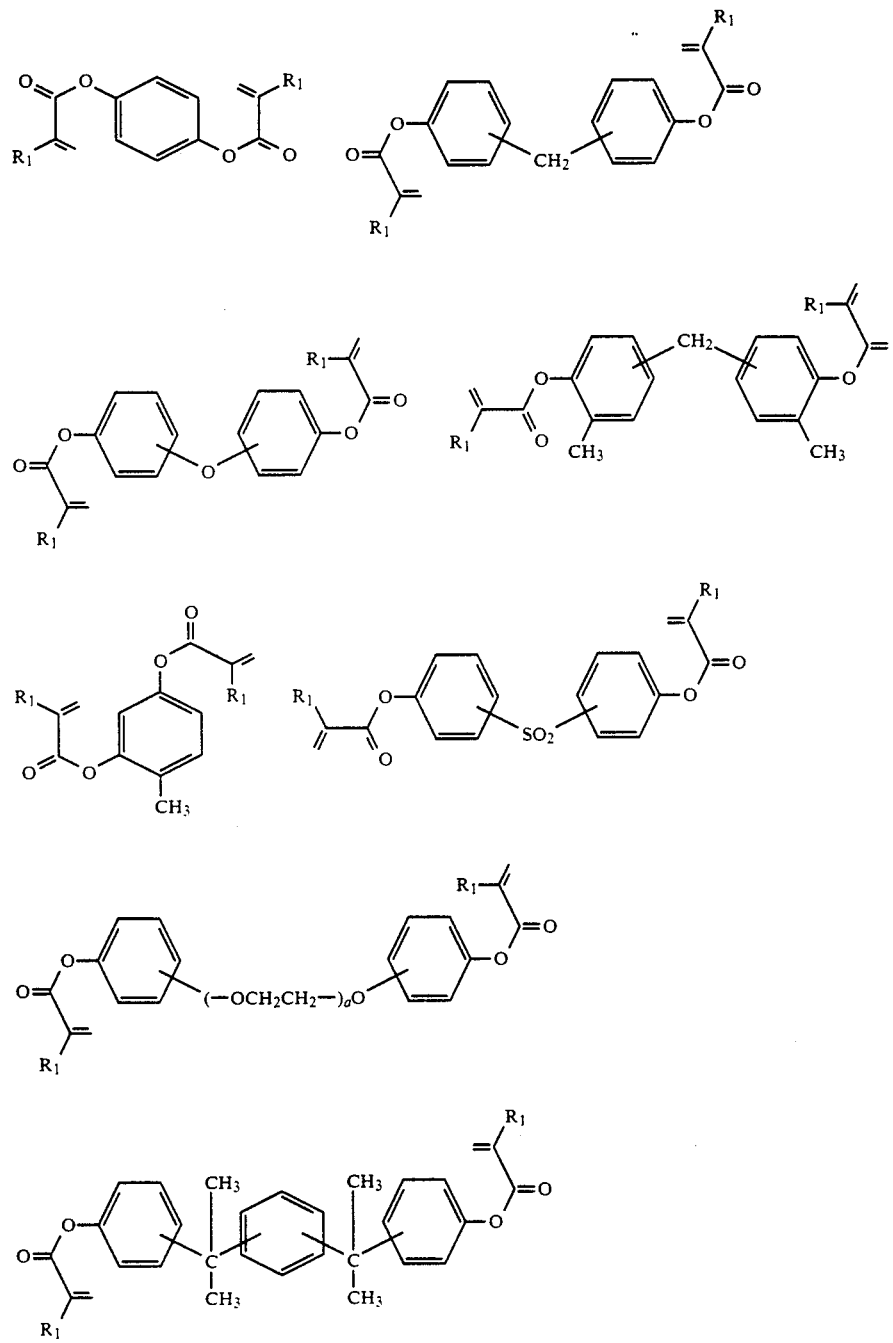

-continued

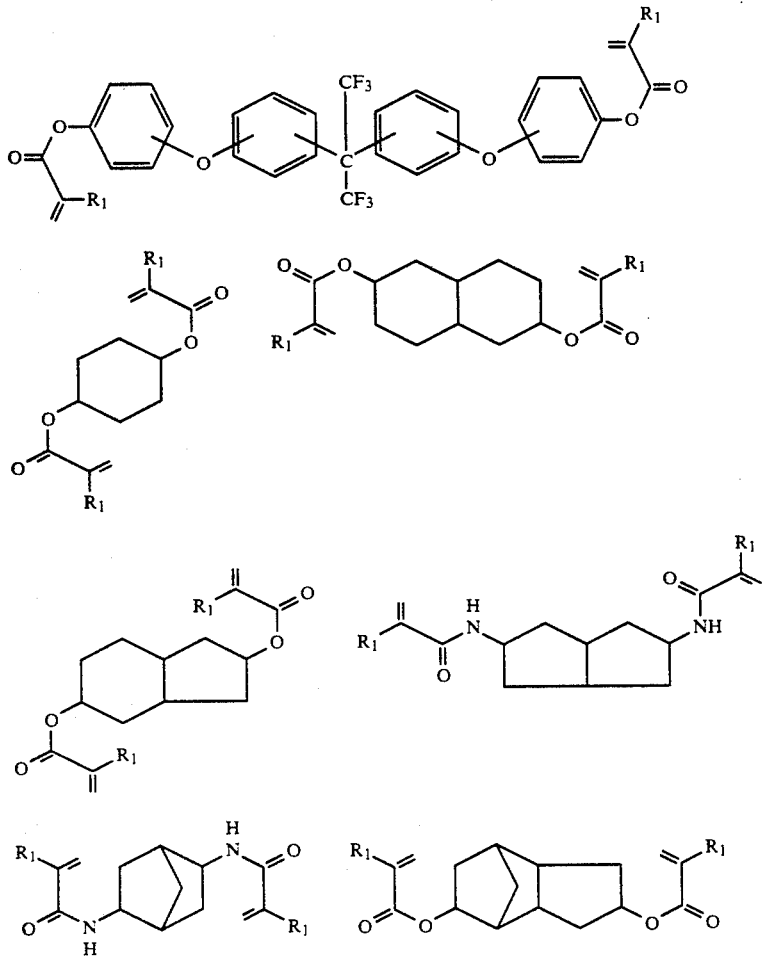

In the above formulae, $R_1$ has the definition recited above. Preferably, $R_1$ is hydrogen or methyl, thus representing acrylic per se and methacrylic per se. Though the above illustrates a plurality of suitable rigid ring substituted polyethylenically unsaturated carboxylates, carboxamides or carboximides, the invention is not limited to them. Only those rigid ring substituted polyethylenically unsaturated carboxylate, carboxamide or carboximide compounds that meet the criteria of the invention in forming effective adhesive bonding primers equivalent to those specifically disclosed are intended to be encompassed herein.

Another class of water-dispersible modified epoxy resin characteristic of the types that are suitable in the practice of the invention are those described in the aforementioned Fan patent. The structure of those polymers are believed to be encompassed by the formula:

the grafted group, and based on Fan, that may be derived from acrylic, methacrylic, styrene, acrylonitrile, and the like. It is believed that polymers based on the technology of Fan, such as utilized in making UCAR Phenoxy Resin PKHW-35, described above, are amine-neutralized carboxylates in which the carboxylates are obtained by inserting a grafted groups such as $X^1$, where the moiety is derived from an acrylic or methacrylic acid structure.

Another class of water-dispersible, modified epoxy resin is RDX 68654 Epoxy Resin Dispersion, a nonionic aqueous white dispersion of a modified high molecular weight bisphenol A epoxy resin, sold by Rhone-Poulenc, Louisville, Ky. U.S.A.

Such water-dispersible, modified epoxy resin may be crosslinked to a cured structure by reaction with an aldehyde based resin, such as a phenol-formaldehyde

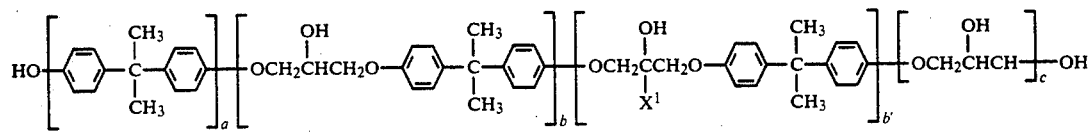

in which b and b' represent the degree of polymerization and are each numbers greater than 1, preferably they have a collective value of at least 30 and most preferably, they have a collective value of 80 or more. The end groups, controlled by a and c, are 0 or 1. $X^1$ is resin, melamine-formaldehyde resin, urea-formaldehyde resin, and the like. The performance of the water-dispersible, modified epoxy resin may be modified by admixture with aliphatic-type polyurethanes, where the aliphatic backbones are derived from aliphatic polyesters and polycarbonates. Illustrative of the aldehyde-based resins are the Resimene ® melamine/urea formaldehyde based resins sold by Monsanto Company, St. Louis, Mo., U.S.A., Beetle ® urea-formaldehyde resins and Cymel ® melamine-formaldehyde resins, both sold by American Cyanamid Company, Wayne, N. J., U.S.A. Illustrative of the aliphatic-type polyurethanes are NeoRez ® high solids waterborne urethane dispersion sold by ICI Resins US, Wilmington, Mass. U.S.A., and Baybond ® polyurethane dispersion sold by Mobay Corporation, Pittsburgh, Pa. U.S.A.

The formulations of the water-dispersible, modified epoxy resin and other resins, for the manufacture of the waterborne structural adhesive bonding primer, follows the traditional path. Flow control aids and filler, apart from the corrosion inhibitors, and the like materials are contemplated as additives to the formulation.

The important corrosion inhibitor mixtures of the invention comprise a number of different classes of materials, ranging from metal salts to straight carboxylic acids. The inhibitors may be inorganic and/or organic in nature.

As pointed out above, the inhibitor component of the primer composition of the invention comprises a mixture of corrosion inhibitors. They are classed herein as components I. and II. With respect to component I., it comprises at least on but not more than two of the cited inhibitors of that category. The first corrosion inhibitor of the component I. category is (a.) a zinc salt of a carboxylic acid of the formula:

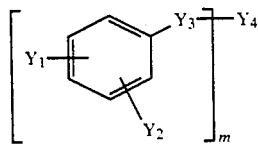

wherein $Y_4$ is hydroxyl or a radical of the formula:

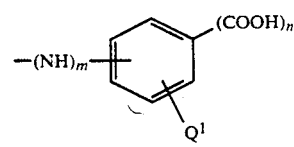

(B)

or

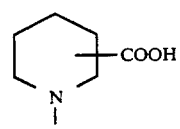

(C)

$Y_3$ is —CO— or —SO$_2$—, $Y_1$ is $C_1$–$C_8$-alkyl, $C_1$–$C_8$-alkoxy or halogen when $Y_4$ is other than hydroxyl, carboxyl when $Y_4$ is hydroxyl, or hydrogen when $Y_4$ is

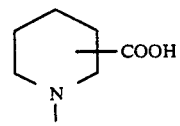

(C)

or $Q^1$ is nitro, or m is 2, $Y_2$ is hydrogen, $C_1$–$C_8$-alkyl, nitro, hydrogen or halogen, $Q^1$ is hydrogen, nitro or halogen, m and n are each 1 or 2.

Specific illustrations of such zinc salts are described in U.S. Pat. Nos. 4,089,690, which describes the use of zinc 5-nitroisophthalate as a corrosion inhibitor for steel in conventional organic coatings; 4,830,775, which describes the use of zinc salts of carboxylic acids of the formula:

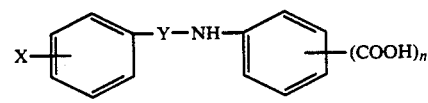

wherein Y is —CO— or —SO$_2$—, X is H or —NO$_2$ and n is 1 or 2; and 4,999,134, which characterizes the remaining structures encompassed by formulas (A), (B) and (C) above. Particularly preferred zinc salts are zinc 5-nitro isophthalate, zinc 2-benzoyl amino benzoate, zinc di-(2-phenyl sulfonyl amino) benzoate, zinc 5-phenyl sulfonyl amino isophthalate, zinc 4-benzoyl amino benzoate, zinc 3-benzoyl amino benzoate, zinc N-toluene sulfonyl anthranilate, zinc N-toluene sulfonyl amino-3-benzoate, zinc N-toluene sulfonyl amino-4-benzoate, zinc N-benzene sulfonyl piperidine-4-carboxylate, zinc 3,5-di-(benzene sulfonyl amino) benzoate, zinc 5-toluene sulfonyl amino isophthalate, and the like.

The other members of the component I. category are (b.) zinc phosphate, and (c.) zinc molybdate.

The other component of the inhibitor mixture is labeled II. and comprises at least one other and different corrosion inhibitor from the group consisting of i) (2-benzothiazolylthio)succinic acid, and ii) a corrosion inhibitor containing a metal other than chromium, having an atomic number of at least 3 and not greater than 81, from Groups 1, 2, 3, 4, 5, 6, 7 and 12 of the Periodic Table of the Elements (New Notation), and mixtures thereof. As noted, the mixture of components I. and II. inhibits the corrosion at the interface of the water-dispersible, modified epoxy resin adhesive primer and the adherend, regardless of the composition of the adherend.

The invention relates to water-dispersible, modified epoxy resin composition in which II. defined above, may represent combinations of inhibitors comprising:

1. (2-benzothiazolylthio)succinic acid combined with the I. component;
2. a mixture of (2-benzothiazolylthio)succinic acid and calcium silicate on an amorphous gel of silica combined with the I. component;
3. a mixture of a precipitated calcium silicate, zinc iodide, and lithium borate combined with the I. component;
4. a mixture of a precipitated calcium silicate, a calcium strontium zinc phosphosilicate, zinc iodide, and lithium borate combined with the I. component;
5. a mixture of zinc iodide and manganese (III) acetate combined with the I. component.

6. bismuth nitrate combined with the I. component;
7. cerium chloride combined with the I. component;
8. cerium molybdate combined with the I. component;
9. sodium thioglycolate combined with the I. component;
10. calcium strontium zinc phosphosilicate combined with the I. component; and
11. a water-dispersible mixture of niobium oxide and cerium molybdate combined with the I. component.

The preferred component II. metal salts are cerium molybdate, sodium thioglycolate, barium tungstate, lithium borate, a calcium silicate on an amorphous gel of silica, and a precipitated calcium silicate. A suitable calcium silicate on an amorphous gel of silica is sold by Davison Chemical Division of W. R. Grace, as Shieldex ®. A suitable precipitated calcium silicate is sold by PPG industries, Inc., as Inhibisil ®. A suitable (2-Benzothiazolylthio)succinic acid is sold by Ciba-Geigy Corp. as Irgacor ®.

The amount of corrosion inhibitor in the water-dispersible, modified epoxy resin adhesive bonding primer formulation is not narrowly critical. Adjustments between the amount of components I. and II. and their relative amounts in the formulation may be utilized to fine tune corrosion inhibition and other properties of the primer.

Though the invention is primarily concerned with chromate-free primers, there are circumstances where a small amount of chromate would be acceptable because a chromate in such an instance is the only co-component of the inhibitor mixture that provides the level of corrosion resistance necessary for the adhesive bonding primer application. In such a circumstance, the other inhibitors to the formulation serve to reduce the amount of chromate needed to achieve the desired level of corrosion resistance. The most effective, and hence, the most widely used inhibitors are chromate salts such as potassium chromate, barium chromate, strontium chromate, zinc chromate and the like. They are usually part of the pigment composition of the formulation. To enhance the corrosion performance, where needed, of the primer of the invention, a small amount of one of the chromates typically used as a corrosion inhibitor may be added to the formulation. A particularly preferred one is barium chromate.

The commercial success of a structural adhesive bonding primer is as much dependent upon handling properties as it is on physical properties. Though the utility of the invention is strongly dependent upon the novel combination of the water soluble modified epoxy resin and the combination of corrosion inhibitors as characterized herein, its commercial utility is also dependent on the handling characteristics of the primer during deposition on the adherend surface. For that reason, a coating aid such as a flow leveler may be required in a commercial formulation of the composition of the invention in order to avoid coating attributes as fisheyes, orange peel, blushing, and the like. A variety of such materials are suitable, but the choices are somewhat limited by the fact that the composition contains water. For example, a flow leveler that is incompatible with water and any other component of the primer composition would not be expected to provide flow leveling. A particularly desirable flow leveler for the compositions of this invention is soy lecithin and soy lecithin based materials. Water soluble solvents, also soluble in the composition, may be used to aid in flow control as well. Alkanols containing 1 to about 5 carbon atoms may be used for this purpose. A particularly suitable alkanol is isopropanol. A glycol ether, which is normally a part of the water soluble resin composition, such as the monoalkyl or dialkyl ethers, may be used to assist in flow control. Suitable glycols include ethylene glycol, 1,2-propylene glycol and 1,3-propylene glycol. The monomethyl ethers thereof are particularly useful. Other solvents are suitable. Their selection is dependent upon the specific solubility or dispersability of the water-dispersible, modified epoxy resin in water and whether the water-dispersible, modified epoxy resin is an emulsified component of the formulation.

The structural adhesive bonding primer of the invention may contain from about 10 to about 40, preferably from about 15 to about 30, weight percent of the weight of the primer formulation of the water-dispersible, modified epoxy resin. When the rigid ring substituted polyethylenically unsaturated carboxylate, carboxamide or carboximide is used and is intimately dispersed in the water vehicle, it is typically present in the primer in an amount of from about 5 to about 35 weight percent, preferably from about 10 to about 30 weight percent of the weight, basis primer formulation weight. The inhibitor pigment content may range from about 0.5 to about 10 weight percent of the weight of the primer composition. In the case of component I., it may be present in the primer composition in the range of about 0.25 to about 8 weight percent, and component II. may be present in the range of about 0.25 to about 8 weight percent.

The structural adhesive bonding primer may be applied to an adherend by any of the coating techniques, including spray coating (conventional and electrostatic), pour coating, dip coating, brushing, and the like. Usually, the higher solids primer compositions are applied by dip and pour coating procedures.

Typical primer formulations encompassed by the invention are set forth in the following table, which characterizes the relative concentrations in percent by weight:

|  | Example No. | | | | |
|---|---|---|---|---|---|
|  | 1 | 2 | 3 | 4 | 5 |
| Resin of Formula IV. formulation (50% solids), see description below | 22.41 | 22.53 | 22.52 | 24.56 | 30.51 |
| ByK-156 | 0.32 | — | — | — | — |
| Soy Lecithin | — | 0.16 | 0.16 | 0.17 | 0.21 |
| Isopropanol | 0.44 | — | — | — | — |
| Bismaleimide of formula V. | 16.54 | 16.63 | 16.62 | 9.06 | 11.26 |
| Corrosion Inhibitor content | 2-10 | 2-10 | 2-10 | 2-10 | 2-10 |
| Zinc 5-nitroisophthalate | 0.2 | 0.2 | 0.2 | 0.22 | 0.27 |
| Zircoaluminate coupling agent | 1.3 | 1.14 | 1.14 | 1.24 | 1.54 |
| Green pigment (colorant) | 0.45 | 0.45 | 0.45 | 0.49 | 0.61 |

-continued

|  | Example No. | | | | |
| --- | --- | --- | --- | --- | --- |
|  | 1 | 2 | 3 | 4 | 5 |
| Foammaster ® NS-1 antifoamer | — | 0.45 | 0.45 | 0.49 | 0.61 |
| Deionized Water | adjusted to 100 | adjusted to 100 | adjusted to 100 | adjusted to 100 | adjusted to 100 |
| Acetic Acid | 0.13 | 0.15 | 0.15 | 0.16 | 0.20 |

The above formulations may be modified by the small addition of a chromate, such as barium chromate, in an amount based on the weight of the primer, of from about 0.05 to about 2 weight percent. The resin in the above formulation contains 50% by weight of resin and Cymel ® 303, measured by the reactants and solvents used in its manufacture (see Example 3 of U.S. Pat. No. 4,800,215), as follows:

ranging from about 0° F. (−17.8° C.) to about 40° F. (4.4° C.).

The grind may be carried out in other types of equipment such as a pebble mill. It is important to obtain of a good fineness of grind and admixture of the components.

Utilizing the above procedure and resin formulation, for formulating the primer of the invention, the follow-

| Ingredient | Amount (% by weight) |
| --- | --- |
| [structure: bisphenol-A diglycidyl ether derivative with oxazolidinone groups and tolyl substituents] | 27.8 |
| Diethanolamine | 14.3 |
| Acetic Acid | 2.9 |
| Cymel ® 303 | 5.0 |
| Dowanol ® PM* | 9.1 |
| Water | 40.9 |

*Monomethyl ether of 1,2-propylene glycol

PRIMER MANUFACTURING PROCEDURE FOR EXAMPLES 1-5

The resin is mixed in a Cowles ® mixer under a strong vortex for about 10 minutes. A small amount of deionized water is added. Mixing is resumed under a strong vortex. The bismaleimide, zinc phosphate, zinc 5-nitroisophthalate and the green pigment are added followed by mixing for about 45 minutes. The maximum temperature at this time should not exceed about 90° F. (32.2° C.). The zircoaluminate coupling agent and Foammaster ® NS-1 antifoamer are added followed by mixing for about 10 minutes. The mixture is given two passes on a sandmill grinding mill, cooling between passes to 90° F. (32.2° C.), or until a grind of >7 on the N.S. scale is achieved. The temperature during the grinding procedure is kept below 110° F. (43.3° C.). Another increment of the deionized water is used to wash the mill and add to the mix. The pH is adjusted with glacial acetic acid to 6.5-6.8, and the solids are adjusted with deionized water to 30%. The mix is pumped through 5 micron filters. The resulting mix has a Zahn cup viscosity of 13-25 seconds. The mix is stored at 40° F., but may be maintained at temperatures ing table illustrates in example 6-15, combinations of inhibitors within the scope of the invention and their performance according to ASTM B117 1000-hour salt spray test, supra. The amount of each of the inhibitors is weight percent solids basis of the formulation. If the resin is 50% solids, then the amount of each of them, based on the total formulation weight, would by one-half that cited in the table.

All salt fog exposure was conducted on primed, 2024-T3 (bare) aluminum panels. Phosphoric acid anodizing per BAC 5514 was used as surface preparation. Panels were primed to 0.2-0.4 mils dry thickness and cured for 60 minutes at 350° F. Primer thickness was measured using a Fischerscope. Scribes were made in the dried panels using both a razor and and ASTM scribing tool. Panels were exposed to 95° F./5% salt fog in a commercial salt fog chamber. Panels were placed vertically in plastic (PVC) racks during exposure. All nonprimed areas were covered using a clear plastic pressure sensitive tape prior to exposure. All panels were exposed to 1000 hours salt fog as the primary screening test. The % shiny can be converted into a scale according to the procedure in ASTM D-1654-79. The scale measures corrosion from 0 to 10, where 10 is no corrosion. A rating as low as 5 may be acceptable for the anti-corrosive coating compositions.

|  | Example | | | | | | | | | |
| --- | --- | --- | --- | --- | --- | --- | --- | --- | --- | --- |
|  | 6 | 7 | 8 | 9 | 10 | 11 | 12 | 13 | 14 | 15 |
| Calcium Silicate on an amorphous gel of Silica | 4.2 | | | | | | | | | |
| Precipitated Calcium Silicate | | | | | 3.0 | | | | | 2.2 |

-continued

| | Example | | | | | | | | | |
|---|---|---|---|---|---|---|---|---|---|---|
| | 6 | 7 | 8 | 9 | 10 | 11 | 12 | 13 | 14 | 15 |
| Calcium Strontium Zinc Phosphate Silicate | | | | | | | | | 3.1 | 3.1 |
| 5-Nitroisophthalate | 0.7 | 0.7 | 0.4 | 0.6 | | 0.7 | 0.7 | 0.7 | 0.7 | 0.5 |
| Cerium Chloride | | | | | 6.3 | | | | | |
| Zinc Phosphate | 2.0 | 1.8 | | 1.9 | | | 1.4 | 1.4 | | 1.3 |
| (2-benzothiazolylthio) Succinic acid | 2.7 | | | | | | | | | |
| Zinc iodide | | | | 0.4 | | | | 0.7 | | 0.4 |
| Lithium Borate | | | | 1.1 | | | | | | 0.8 |
| Manganese (III) Acetate | | | | | | | | | 2.8 | |
| Bismuth Nitrate | | | | | | | | 3.5 | | |
| Cerium Molybdate | | 2.4 | | | 2.4 | | | | | |
| Niobium Oxide | | | | | 0.7 | | | | | |
| Sodium Thioglycolate | | | 3.3 | | | | | | | |
| Pits in | 0.9 | 0.4 | 0.5 | 1.8 | 0.4 | 1.9 | 4.1 | 2.7 | 2.7 | 3.5 |
| Scribe % Shiny | 60 | 90 | 95 | 40 | 95 | 60 | 40 | 45 | 85 | 0 |
| Undercutting | 1/32 | 1/32 | 1/64 | 1/64 | 1/64 | 1/64 | 1/16 | 1/32 | 1/64 | 1/64 |

I claim:
1. A structural adhesive bonding primer composition containing a water-dispersible, modified epoxy resin and a water-dispersible corrosion inhibitor mixture of components I. and II. in which:

Component I. is at least one of:
(a.) a zinc salt of a carboxylic acid of the formula:

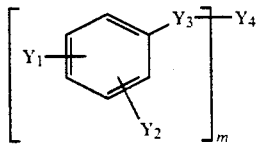

(b.) zinc phosphate, and
(c.) zinc molybdate,
wherein $Y_4$ is hydroxyl or a radical of the formula:

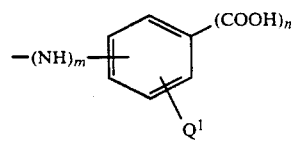 (B)

or

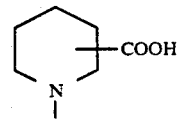 (C)

$Y_3$ is —CO— or —SO$_2$—, $Y_1$ is $C_1$-$C_8$-alkoxy or halogen when $Y_4$ is other than hydroxyl, carboxyl when $Y_4$ is hydroxyl, or hydrogen when $Y_4$ is

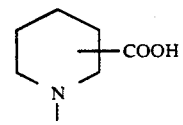 (C)

or $Q^1$ is nitro, or m is 2, $Y_2$ is hydrogen, $C_1$-$C_8$-alkyl, nitro, hydrogen or halogen, $Q^1$ is hydrogen, nitro or halogen, m and n are each 1 or 2; and Component II. is at least one other and different corrosion inhibitor from the group consisting of:
 i) (2-benzothiazolylthio)succinic acid, and
 ii) a corrosion inhibitor containing a metal other than chromium, having an atomic number of at least 3 and not greater than 81, from Groups 1, 2, 3, 4, 5, 6, 7 and 12 of the Periodic Table of the Elements (New Notation), and mixtures thereof.

2. The structural adhesive bonding primer composition of claim 1 wherein component II. is a member from the group consisting of:
 a. (2-benzothiazolylthio)succinic acid;
 b. a mixture of (2-benzothiazolythio)succinic acid and calcium silicate;
 c. a mixture of a precipitated calcium silicate, zinc iodide, and lithium borate;
 d. a mixture of a precipitated calcium silicate, a calcium strontium zinc phosphosilicate, zinc iodide, and lithium borate;
 e. a mixture of zinc iodide and manganese (III) acetate;
 f. bismuth nitrate;
 g. cerium chloride;
 h. cerium molybdate;
 i. sodium thioglycolate;
 j. calcium strontium zinc phosphosilicate; and
 k. a water-dispersible mixture of niobium oxide and cerium molybdate.

3. The structural adhesive bonding primer composition of claim 2 wherein component I. is a mixture of zinc 5-nitroisophthalate and zinc phosphate, and component II. is the mixture of (2-benzothiazolylthio)succinic acid and calcium silicate.

4. The adhesive bonding primer composition of claim 2 wherein component I. is a mixture of zinc 5-nitroisophthalate and zinc phosphate, and component II. is cerium molybdate.

5. The adhesive bonding primer composition of claim 2 wherein component I. is zinc 5-nitroisophthalate and component Ii. is sodium thioglycolate.

6. The adhesive bonding primer composition of claim 1 wherein there is provided a small amount of a chromate corrosion inhibitor.

7. An adhesive bonding primer composition containing a water-dispersible, modified epoxy resin and a water-dispersible corrosion inhibitor comprising a mixture of niobium oxide and cerium molybdate.

* * * * *